United States Patent [19]

Schas et al.

[11] Patent Number: 4,587,514

[45] Date of Patent: May 6, 1986

[54] INTERFACE METHOD AND APPARATUS

[75] Inventors: Marc L. Schas, San Jose; Steven C. Taylor, San Mateo, both of Calif.

[73] Assignee: Verilink Corporation, Sunnyvale, Calif.

[21] Appl. No.: 648,124

[22] Filed: Sep. 7, 1984

[51] Int. Cl.[4] .............................................. H03M 7/28
[52] U.S. Cl. ................................ 340/347 DD; 370/95
[58] Field of Search ............... 340/347 DD; 370/100, 370/95, 99

[56] References Cited

U.S. PATENT DOCUMENTS

Re. 28,577 10/1975 Schmidt ................................ 370/95
3,603,739 9/1971 Edron ..................................... 370/95

Primary Examiner—William M. Shoop, Jr.
Assistant Examiner—Saul M. Bergmann
Attorney, Agent, or Firm—Jeffrey J. Blatt

[57] ABSTRACT

An interface apparatus utilizing data encoding/decoding methods having particular application for use in interfacing data processing and telecommunication equipment is disclosed. The interface apparatus includes an encoder for encoding inputted data for transmission on a telecommunication system, and a decoder to receive the encoded data and decode the data stream such that it identically represents data originally provided to the encoder. The present invention detects channels in the inputted data which contain a predetermined value of bits, and stores the channel numbers of these detected channels in digital storage means. These detected channels are then deleted from the data stream, and the remaining inputted data in each of the data channels is shifted such that data previously located in the first data channel is inserted in the data channel offset by the number of channels stored in the storage means. The present invention then inserts the channel numbers previously stored in the storage means in empty data channels created by the shifting process. This encoded data stream is then transmitted, and is received by another unit of the present invention coupled to receiving data processing equipment. A decoder of the present invention detects the channel numbers previously inserted into the data channels and stores these numbers in a channel address buffer. The decoder deletes the channel numbers in the data channels and shifts the data in the remaining channels, such that the received data is sequentially inserted beginning in the first data channel. Previously defined predetermined values are inserted in the now empty data channels which are identified by the channel numbers stored in the channel address buffer.

23 Claims, 12 Drawing Figures

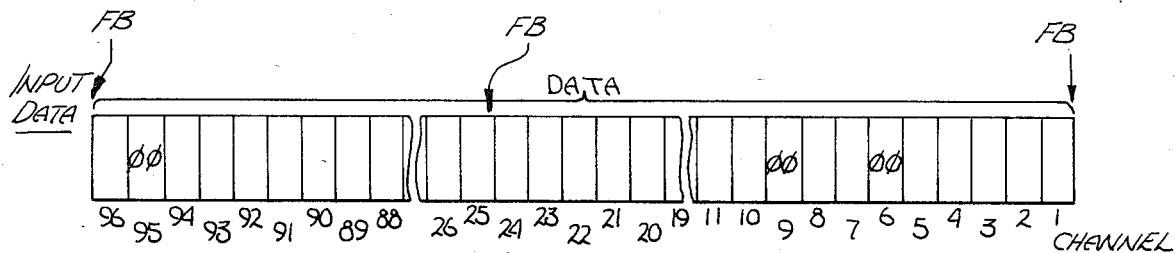
*Fig. 4a*
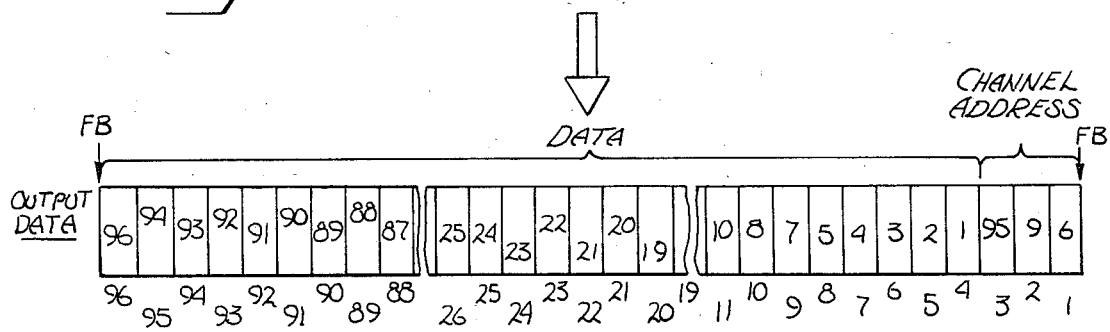
*Fig. 4b*
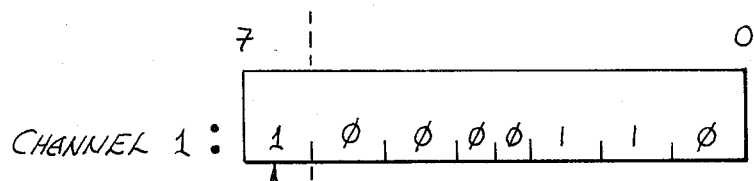
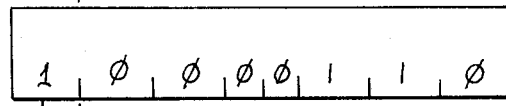
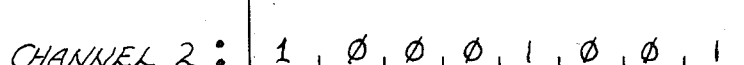
*Fig. 5*
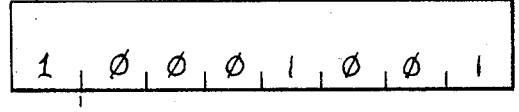
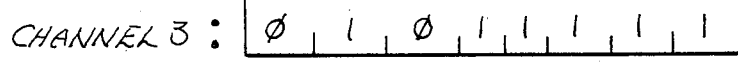
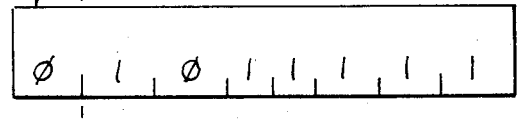

SAMPLE STANDARD FRAME BIT PATTERN: FB 1 2 3 4 5 6 7 8 9 10 11 12
1 0 0 0 1 1 0 1 1 1 0 0

SAMPLE MODIFIED PATTERN:
1 0 0 1 1 1 0 0 1 1 0 1

INTERFACE METHOD AND APPARATUS

BACKGROUND OF THE INVENTION

1. Field of the Invention

The present invention relates to the field of data encoding and compression, and more particularly, to data encoding and decoding techniques and devices for interfacing data processing units.

2. Art Background

Analog transmission has dominated the telecommunications industry since its inception. Signals have been sent by some physical quantity (e.g. voltage) which are continuously varied as a function of time. With the advent of digital electronics and computers, it was soon realized that digital transmission is superior to analog transmission in several important ways. For example, analog circuits require amplifiers which attempt to compensate for the attenuation in the line. However, the analog systems cannot compensate exactly for the attenuation encountered, especially if the attenuation is different for different frequencies. Since the attenuation error is cumulative, long distance calls that go through many amplifiers are likely to suffer considerable distortion. In comparison, digital regenerators can restore the weakened incoming signal exactly to its original value, inasmuch as the only possible values are 0 and 1. Accordingly, digital regenerators do not suffer from cumulative attenuation error problems. In addition, digital transmission of voice, data, music, television, video, telephone and the like can all be multiplexed together to make more efficient use of the equipment. Very high data rates are possible using existing lines and the cost of digital computers and integrated circuits continues to drop.

When a telephone subscriber attached to a digital end office makes a call, the signal emerging from his local loop is an ordinary analog signal. This analog signal is then sampled and digitized at the end office by a CODEC (coder/decoder), producing a seven or eight bit number. Typically, the CODEC makes 8000 samples per second (at 125 microseconds per sample) because the Nyquist theorem provides that this is sufficient to capture all the information from a four kilohertz bandwidth. This technique is commonly referred to as pulse code modulation (PCM).

A variety of protocol standards have been developed for telecommunication equipment to transfer data from one data processing unit to another. Consequently, there are now a variety of incompatible schemes in use around the world. One method that is in wide spread use is the Bell System T-1 carrier standard. As will be described, the T-1 carrier system can handle twenty-four voice channels multiplexed together. Typically, the analog signals are multiplexed using time division multiplex (TDM), with the resulting analog stream being fed to the CODEC rather than having twenty-four separate CODECs and then merging the digital output. Each of the twenty-four channels, in turn, is permitted to insert eight bits into the output stream. Seven of these bits are data, and one bit is for control, yielding fifty-six thousand bits per second (BPS) of data, and eight thousand BPS of signal information.

Under the T-1 standard, a frame consists of $24 \times 8 = 192$ bits, plus one extra bit for framing, yielding 193 bits every 125 microseconds. This gives a gross data rate for the T-1 system of 1.544 megabits per second (Mbps). The 193rd bit is used for frame synchronization. Normally, the receiver continously checks the frame bits to make sure that synchronization has not been lost. If the receiver gets out of sync, the receiver may then scan for the frame bit pattern to get re-synchronized.

The most recent Bell System T-1 standard (publication 62411, dated September, 1983) states that in order to insure adequate timing recovery of the regenerative digital facilities and circuit performance, certain pulse density requirements shall be met by data processing equipment coupled to the telecommunication system. The data processing equipment must not transmit more than fifteen logical zeros in a row, and in each and every time window of $8 \times (N+1)$ bits (where N can equal 1 through 23), there should be at least N logical ones present. In other words, a user desiring to transmit digital data over the Bell System phone lines must insure that the minimum number of logical ones is present in the data stream. For digitized voice transmission, the minimum number of ones may be easily provided by altering the least significant bit (LSB) (bit 8) for each channel of digitized voice. This minor modification to the digital voice sample would result in no perceptible difference in voice reconstruction by the receiving equipment. However, in the case where data is transmitted which does not represent digitized voice signals, but rather, bank accounts, spacecraft data, identification codes and the like, any alteration of the data through the insertion of ones in accordance with the Bell standard could prove disastrous.

As will be disclosed, the present invention provides methods and apparatus which permit a user to interface data terminal equipment for transmission and reception to the Bell T-1 carrier system. The present invention provides data encoding and compression techniques which insure transmitted data is compatible with the Bell T-1 standard, while preserving the integrity of the data at the receiving end after decoding.

Although the present invention is discussed in relation to the Bell T-1 carrier standard, it will be appreciated by one skilled in the art that the present invention has utility far exceeding the mere interface with the Bell telecommunication system. For example, the present invention may be used in a variety of applications where data encoding and compression with subsequent decoding after transmission is required.

SUMMARY OF THE INVENTION

The present invention provides an interface apparatus utilizing data encoding/decoding methods having particular application for use in interfacing data processing and telecommunication equipment. The data which is inputted into the present invention is organized into a plurality of sequential channels identified by channel numbers $(1-N)$, each of the data channels comprising a plurality of bits. The present invention detects channels in the inputted data which contain a predetermined value of bits (e.g. all zeros) and stores the channel numbers of these detected channels in digital storage means. These detected channels are then deleted from the data stream, and the remaining inputted data in each of the data channels is shifted such that data previously stored in the first data channel is inserted in the data channel offset by the number of channels stored in the storage means. The present invention then inserts the channel numbers previously stored in the storage means in empty data channels created by the shifting process.

This encoded data stream is then transmitted, over for example a Bell T-1 carrier system, and is received by another unit of the present invention coupled to receiving data processing equipment. In the present embodiment, the encoder of the present invention detects channels wherein all eight bits comprising the channel are filled with logical zeros. The present invention effectively removes these zero channels such that a violation of the Bell T-1 carrier standard is avoided.

Once the encoded data stream is received, the decoder of the present invention detects the channel numbers previously inserted in the data channels and stores these numbers in a channel address buffer. The decoder then deletes the channel numbers stored in the data channels and shifts the data in the remaining channels, such that the received data is sequentially inserted beginning in the first data channel. The decoder of the present invention then locates the data channels identified by the channel numbers stored in the channel address buffer, and once again shifts data located in the data channels such that an empty channel is created for those channels identified by the stored channel numbers. Previously defined predetermined values (e.g. zeros) are inserted in the now empty data channels which are identified by the channel numbers stored in the channel address buffer.

Accordingly, the present invention permits any combination of bits to be transmitted over a telecommunications network without regard to the pulse density requirements of the telecommunication system. Bit patterns which constitute protocol violations of the telecommunication or other system may be selectively identified and removed prior to transmission, and the original data stream reconstructed through the decoding portion of the present invention for use by other data processing equipment.

BRIEF DESCRIPTION OF THE DRAWINGS

FIGS. 4a and 4b illustrate the encoding method of the present invention.

FIG. 5 illustrates the encoding of channel addresses and the setting of channel flags provided by the encoding method of the present invention.

NOTATION AND NOMENCLATURE

Figure 1:
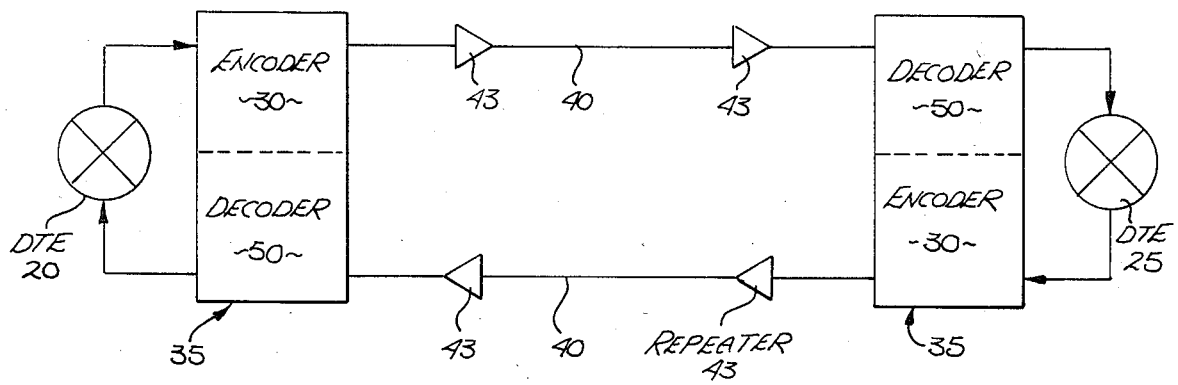
FIG. 1 is a diagrammatical illustration of the location of the present invention in a telecommunication system.

The detailed description which follows is presented largely in terms of algorithms and symbolic representations of operations on data bits using digital electronics. These algorithmic descriptions and representations are the means used by those skilled in the data processing arts to most effectively convey the substance of their work to others skilled in the art.

An algorithm is here, and is generally conceived to be, a self-consist sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers or the like. It should be kept in mind, however, that all of these and similar terms to be associated with the appropriate physical quantities and are merely convenient labels applied to these quantities.

Further, the manipulations performed are often referred to in terms, such as adding, comparing, shifting, deleting, and inserting which are commonly associated with mental operation performed by a human operator. No such capability of a human operator is necessary, or desireable in most cases, in any of the operations described herein which form part of the present invention; the operations are machine operations performed by digital electronics. The distinction between the method operations and operating the digital equipment and the method of computation or manipulation itself should be noted.

The present invention also relates to apparatus for performing these method operation. This apparatus may be specially constructed for the required purpose or may comprise a general purpose computer selectively activated or reconfigured by a computer program stored in the computer. The algorithms presented herein although describe in part with reference to a particular apparatus in the presently preferred embodiment, is not necessarily inherently related to any particular computer or apparatus. In particular, it is contemplated that various general purpose machines may be used with the teachings herein, or it may prove more convenient to construct more specialized apparatus to perform the required method steps. The required structure for a variety of these machines will appear from the description given below.

DETAILED DESCRIPTION

In the following description, numerous details are set forth such as specific numbers of bits, frame sizes, flag bits, binary operations, etc. in order to provide a thorough understanding of the present invention. However, it will be apparent to one skilled in the art that the present invention may be practised without these specific details. In other instances, well known circuits and structures are illustrated in block diagram form and not described in detail in order not to obscure the present invention unnecessarily.

With reference now to FIG. 1, a telecommunication system for transmitting data between data terminal equipment (hereinafter "DTE") 20 and a DTE 25 is illustrated. As shown, data originating from DTE 20 is coupled to an encoder section 30 of the present invention's interface apparatus 35. As will be described, data received by the encoder section 30 is appropriately encoded and transmitted along a telecommunication system line 40 which includes appropriate repeaters 43. In practice, encoder section 30 encodes and compresses inputted data such that the encoded data format is compatible with the Bell T-1 carrier telecommunication system. The encoded and compressed data is received by a decoding section 50 of the present invention's interface apparatus 35 which decodes and reconstructs the original data provided by DTE 20. The reconstructed data is then coupled to DTE 25 for consumption. Similarly, data originating from DTE 25 is coupled to the encoder section 30 of the respective interface apparatus 35 for encoding and transmission to the respective interface apparatus coupled to DTE 20. Accordingly, it will be appreciated that the function of the present invention's interface apparatus 35 is to encode data such that it is compatible with the telecommunication system over which the data must be transmitted.

Figure 2:
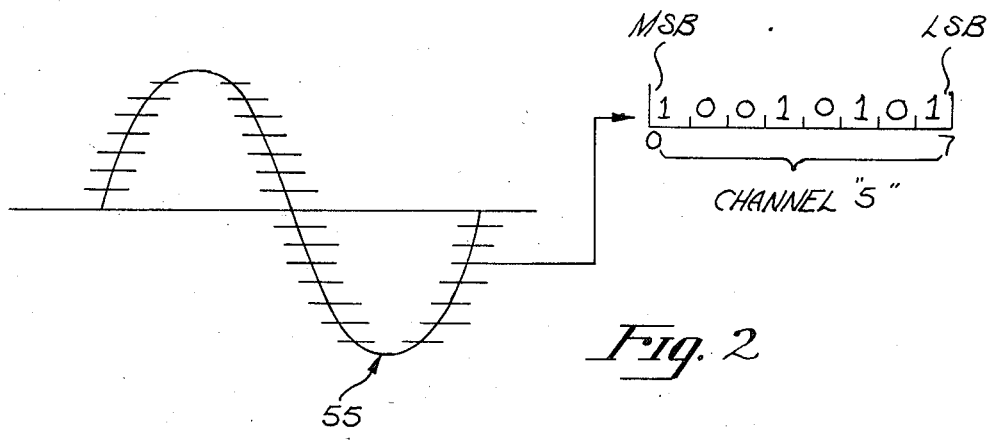
FIG. 2 illustrates the digitizing of an analog signal.

As illustrated in FIG. 2, telecommunication systems, such as the Bell T-1 carrier system, were initially designed to carry representations of digitized analog signals representing a human voice. Analog signal parameters, such as voltage, amplitude and the like, are sampled at predetermined intervals and the value of the particular parameter measured is described by a series of eight bits. Each sample is commonly stored in a "channel". In time domain multiplexed (TDM) systems, numerous conversations may be carried on a single line by multiplexing sample channels together. For example, in the Bell T-1 carrier system, 24 voice channels are multiplexed together such that each channel stores one sample of the digitized analog signal. The sampling rate is so fast that the receiving telecommunications system can reassemble the analog signal by sequentially receiving data representative of a single sample of the analog voice, in for example channel number 5. In other words, the receiver obtains another digitized sample representing the amplitude, voltage or the like being measured only once every twenty-four received channels. As will be described, modern telecommuncation based on the T-1 carrier standard utilizes a 288 channel "superframe" which is delineated by frame bits every twenty-four channels.

Figure 3:
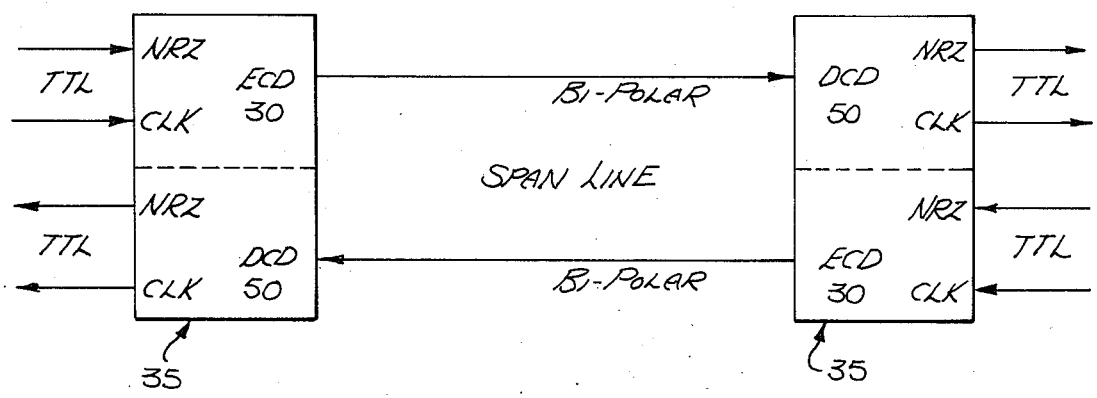
FIG. 3 diagrammatically illustrates the types of electrical signals inputted and outputted by the present invention when coupled to a typical telecommunication system.

As illustrated in FIG. 3, data provided interface apparatus 35 from a DTE is typically in a TTL and nonreturn to zero (NRZ) logic format. The encoding device 30 of interface apparatus 35 converts the electrical characteristics of the data into a bipolar form which can be transmitted by the telecommunication network. Similarly, the received bipolar data is decoded by the decoder section 50 and once again converted into data having electrical characteristics of TTL and NRZ. Inasmuch as the conversion between TTL and bipolar signals is commonly done in the art, this Specification will not provide the details of converting such electrical characteristics.

Referring now to FIGS. 4a and 4b, the encoding method of the present invention will be described. As previously discussed, the Bell T-1 carrier system prohibits the inclusion of channels containing all logical zeros. In a case where an analog voice signal is digitized, the least significant bit (LSB) of the data sample may be forced to a logical 1 without deteriorating perceptible voice characteristics. However, in a case where data is transmitted over a telecommunication system, the forcing of a logical 1 in data channels could prove disastrous and destroy data integrity. As shown in FIG. 4a, data inputted by DTE 20 is received by the encoder section 30 of interface apparatus 35 in the format shown. Ninety-six data channels are provided in what is known as a "clear channel superframe" (referred to at times as "CCSF"). Each data channel comprises an eight bit word representing digital data or a digitized voice sample. In accordance with the T-1 carrier protocol, frame bits (FB) are provided every twenty-four channels, the logical state of these bits being pre-defined to permit a receiving unit to synchronize incomming frames. Although this Specification and the examples contained herein are directed toward the protocol for the Bell T-1 carrier system, it will be appreciated that the present invention has utility far exceeding the encoding of data for the Bell T-1 carrier, and may be used in a variety of interfacing applications. As previously discussed, current T-1 carrier standards require that a logical 1 be present effectively in every channel of transmitted data.

Data which is inputted into the encoder 30 of the present invention's interface apparatus 35 is stored in random access memory (RAM), and is then scanned for data channels in which a predetermined value of bits is stored. In the Bell T-1 carrier system example illustrated, data channels are identified which contain eight bits of logical zeros. In the example in FIG. 4a, data channels 6, 9, and 95 are detected by encoder 30 as containing all logical zeros. The channel numbers (addresses), namely "6", "9" and "95" are stored in a random access memory (RAM) location within the encoder 30, as will be described more fully below. Once the channel numbers of the data channels containing the predetermined value of bits is stored in RAM, these data channels are deleted from the inputed data. In other words, in the example illustrated in FIG. 4a, data channels 6, 9 and 95 are simply deleted from the data stream such that data channels 5 and 7 are now adjacent. As illustrated in FIG. 4b, encoding section 30 additionally shifts the data contained in the remaining data channels such that data previously inserted in the first data channel is offset by the number of channels which have been stored in RAM. The channel addresses previously stored in RAM are then inserted in the empty data channels created by the previous shifting step. In the example illustrated in FIG. 4b, the binary form of channel addresses 6, 9 and 95 are provided in data channels 1, 2 and 3 respectively. Thus, for each 96 channel superframe of inputted data, the encoded data transmitted by the encoder 30 includes channel addresses transmitted prior to actual data.

The format which encoder 30 stores the channel addresses in data channels is represented in FIG. 5. In the example shown, channel address 6 is stored in channel number 1 in a binary representation of eight bits. Bits 0 through 6 are reserved to identify the channel address, in this case channel number 6, and bit 7 is reserved as a channel flag. In the present embodiment, a channel flag of a logical 1 indicates that subsequent channels contain channel address numbers, and a logical 0 indicates that no further channel addresses are contained in subsequent channels, but rather, data is contained therein. In accordance with the example given, channel 3 of FIG. 5 includes a bit number 7 in which a logical zero is stored indicating that the next and all subsequent channels contain transmitted data. Thus, the encoding method of the present invention utilizes the first data channels of the transmitted CCSF to store the channel addresses which correspond to the transmitted channels originally filled with all logical zeros, or some other predetermined bit pattern. Thus use of the present invention's channel flags, as will be described, permits the decoder 50 to delineate between channels which contain channel addresses and channels containing data.

Figures 6, 7:
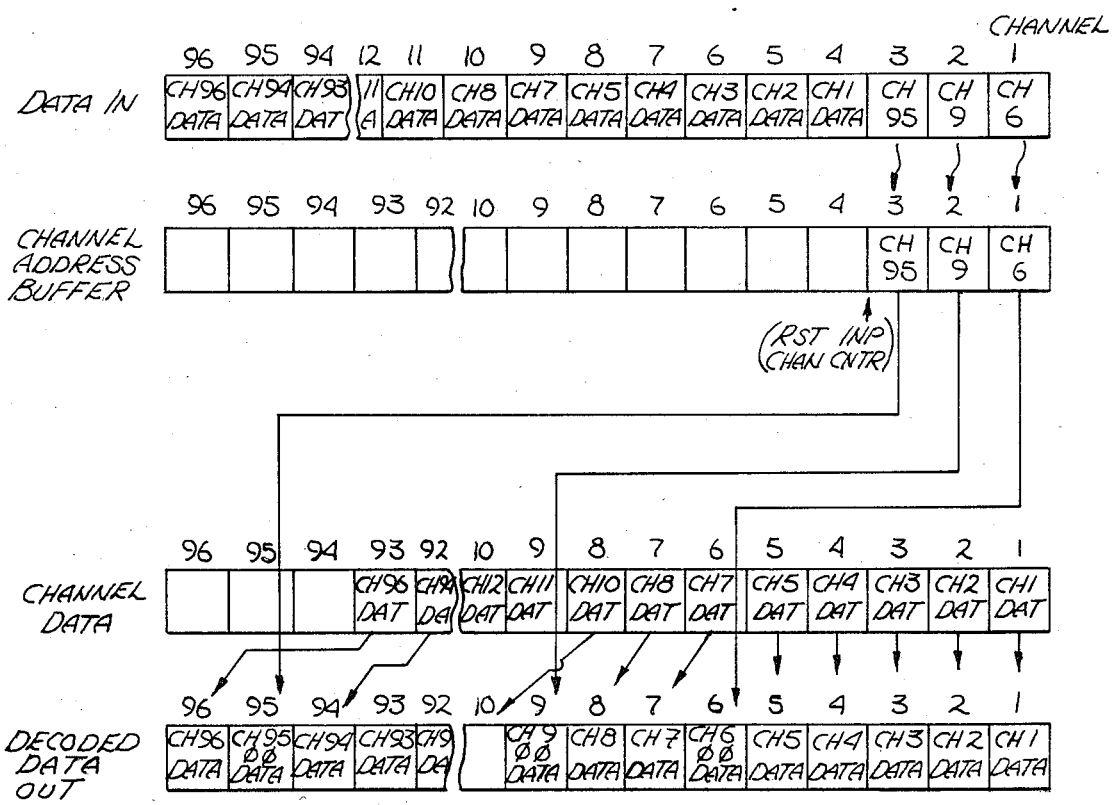
FIG. 6 illustrates a standard and modified frame bit pattern in accordance with the method of the present invention.
FIG. 7 illustrates the decoding method utilized by the present invention.

The encoding method of the present invention further alters the bit pattern of the frame bits delineating each twenty-four channel frame within the ninety-six channel CCSF illustrated in FIG. 4. There are four frame bits for each 96 channel CCSF, such that each frame bit delineates a block of 24 channels within the clear channel superframe. In the Bell T-1 carrier system, the logical state of each frame bit (1–12) is set in accordance with a predetermined sequence. A sample standard frame bit pattern is illustrated in FIG. 6 wherein the first frame bit is set to a logical 1, and frame bit number 12 set as a logical 0. The intermediate frame bits are given logical states in accordance with that illustrated in FIG. 6. The encoding method of the present invention includes the alteration of the logical state of designated frame bits within each superframe. Encoder 30 of interface apparatus 35 selectively modifies frame bits number 4, 8 and 12 by reversing the logical state of the frame bit from that designated in the standard frame bit pattern. In other words, with reference to FIG. 6, the logical state of frame bit number 4 is reversed (i.e. logical 0 to a logical 1). Similarly, the logical states of frame bits 8 and 12 are also reversed. It will be noted that although frame bit number 1 may preceed channel 1 in any particular superframe, that this position is arbitrary and that frame bit 1 could preceed any channel within the superframe with the subsequent frame bits having logical states in accordance with that disclosed in FIG. 6. The alteration of the logical state of the standard frame bit pattern results when encoder 30 identifies one or more bits in CCSF channels 1 through 96 in which a predetermined bit pattern is detected (e.g. all logical zeros in the present example).

Referring now to FIG. 7, the decoding method of the present invention will be described. Once data has been encoded by encoder 30 in accordance with the method disclosed in FIGS. 4–6, it is transmitted over a telecommunication system and received by a corresponding interface apparatus 35 which is in turn coupled to the receiving DTE 25. The encoded data is inputted and stored in a decoder section 50 of interface apparatus 35 in order to reconstruct the original data provided by transmitting DTE 20. Decoder 50 sequentially scans the contents of each received channel to detect the presence of a channel flag having a logical 0. The presence of a channel flag having a logical 0 state indicates that all inclusive preceeding channels contain channel address numbers as opposed to data. These channel addresses are stored in a channel address buffer, as illustrated in FIG. 7, and the channel addresses previously stored in data channels within the CCSF are deleted and the data in each data channel is then shifted such that the data received by decoder 50 is sequentially stored beginning in the first data channel.

Decoder 50 then shifts data located in data channels which are identified by the channel addresses previously stored in the channel address buffer, such that an empty channel is created for those channels stored in the address buffer. In the example illustrated in FIG. 7, decoder 50 identified channels 1, 2 and 3 as storing address channels. The contents of channel numbers 1, 2 and 3 were stored in the channel address buffer, namely channel addresses "6", "9" and "95" as shown in the Figure. The channel addresses previously provided in channels 1, 2 and 3 were then deleted, and the data beginning in channel number 4 was shifted such that the received data is sequentially inserted beginning in the first data channel (i.e. channel number 1). Decoder 50 then shifted data located in the data channels identified by the addresses stored in the channel address buffer (i.e. channel 6, 9 and 95), such that a "empty channel" is created at the appropriate location for those channels. Decoder 50 then inserts predetermined bit values in the now empty channels identified by the channel numbers stored in the channel address buffer. In the present example, logical zeros are inserted into channels 6, 9 and 95. The resulting data in channels 1 through 96 represents an identical sequence of data inputted into the encoder 30 by DTE 20. The decoder data is then coupled to receiving DTE 25 for consumption.

In summary, the decoding method of the present invention initially identifies those data channels storing channel addresses and stores these channel addresses in a channel address buffer. The remaining data is then shifted such that the data is sequentially stored beginning in the first data channel of the CCSF. Those channels identified by the channel addresses stored in the channel address buffer of decoder 50 are cleared and the previously stored data is shifted such that an empty channel is created for the previously identified channel addresses. Predetermined bit values are then inserted into these now empty channels identified by the channel address buffer. In the present example, logical zeros are inserted. However, it will be appreciated, that any predetermined bit pattern may be inserted into these channels by the decoder 50. Accordingly, the inputted data is decoded such that the resulting data output of decoder 50 identically corresponds to the data inputted into the encoder section 30 of DTE 20. In addition, decoder 50 reverses the polarity of frame bits 4, 8 and 12 such that the original standard frame bit pattern (see FIG. 6) delineates the frames of the decoded data outputted by the decoder 50.

Figure 8:
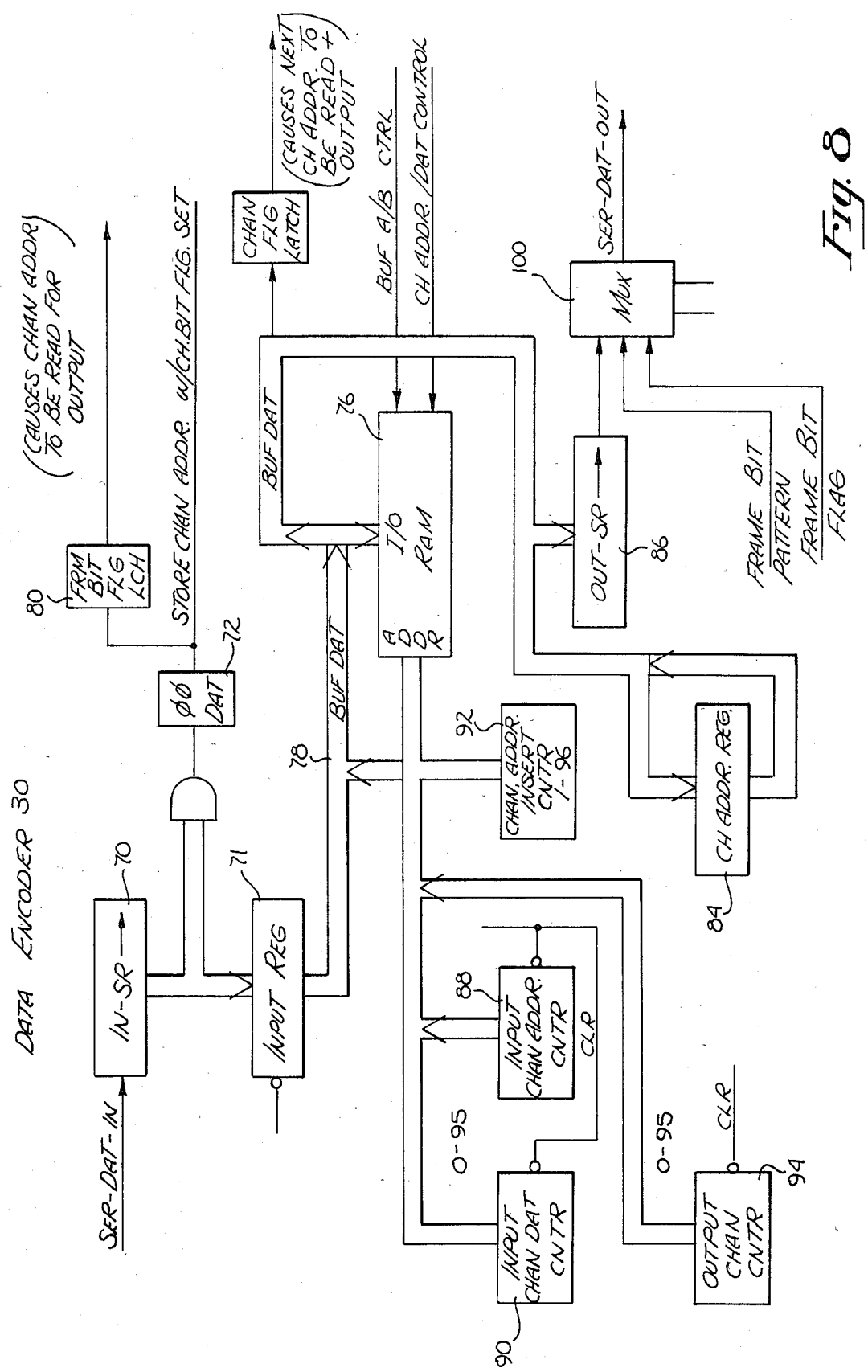
FIG. 8 is a block diagram disclosing the data encoder for accomplishing the encoding method of the present invention.
Figure 9:
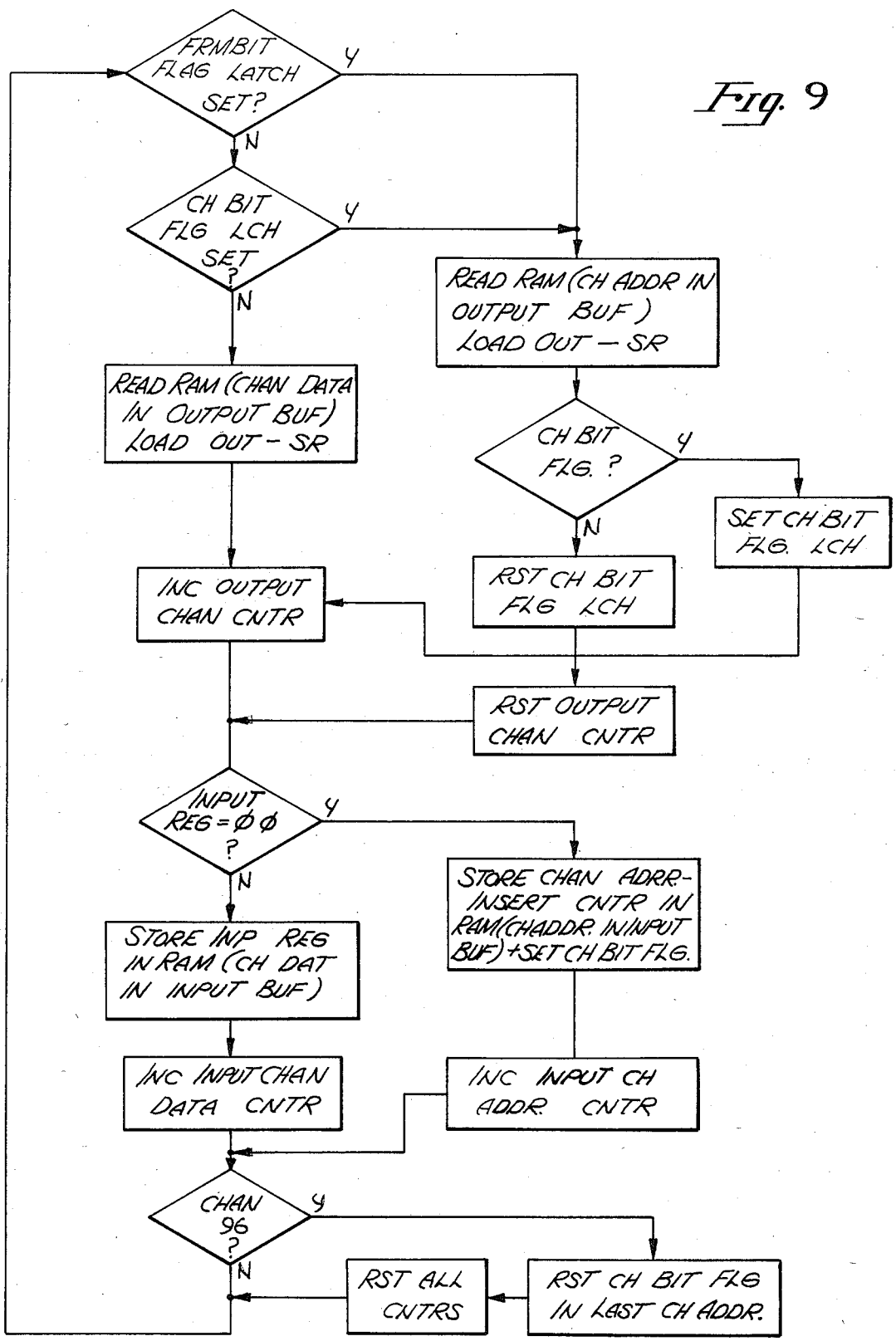
FIG. 9 is a flow chart illustrating the encoding method of the present invention as performed by the encoder of FIG. 8.

With reference to FIG. 8 and the flowchart of FIG. 9, the presently preferred embodiment of encoder 30 will be described. It will be appreciated that although the structure and order of operation of encoder 30 is illustrated, that the method of the present invention may be realized using a variety of digital hardware designs. Accordingly, the encoder illustrated in FIG. 8 and described with reference to FIG. 9 is representative of only a single possible implementation for realizing the encoding method of the present invention.

Data which is to be encoded by encoder 30 is inputted in a non-return to zero (NRZ) format into an input shift register 70. A data flip-flop 72 is set in the event all eight bits of an inputted channel equal a predetermined bit value, in the present embodiment, all logical 0's. This data is then latched into the input register 71 while the next eight bit channel is inputted into shift register 70. A random access memory (RAM) 76 is coupled to the input register 71 along a bus 78 on which the inputted data is transmitted. The RAM memory 76 which is used to store each superframe is divided into two major sections, an input buffer and an output buffer. Each buffer is divided into channel address and channel data sections. The input and the output buffers of the RAM 76 are used in a toggle type basis such that the section of memory which is used for inputting a CCSF on the previous processing cycle will be used to output the stored channel addresses and channel data on the next processing cycle. Thus, during the time the next channel is inputted into shift register 70, the present channel is processed. In the event that a channel to be processed includes bits of a predetermined value (in the present example all 0's), the channel address in the clear channel superframe is provided by a channel addresses insert counter 92, and is stored into the channel address area of the RAM 76. If the channel does not include all 0's in the present example, the data is stored identically in the channel data area of the RAM 76 at RAM addresses provided by an input channel data counter 90. Upon the input of the first channel having a predetermined bit value (e.g. all 0's), a frame bit flag latch 80 is set to transmit a framing bit of the opposite polarity normally sent in accordance with the discussion relative to FIG. 6 above. The change of polarity of the framing bit is used to signify to the decoder 50 that the first byte after this framing bit flag is a channel address. Upon subsequent inputting of channels with the predetermined bit value, namely logical 0's in the present embodiment, the eighth bit of each channel address is set to a logical 1 and stored to signify to the decoder that the next byte is a channel address. The sequential storing of channel addresses and channel data in their respective areas of RAM 76 is continued until the entire CCSF is stored in the RAM. During the processing of the last channel (channel 96), the last channel address that was stored is read from RAM 76 and stored in a channel address register 84. The eighth bit of the channel address is reset and this modified channel address is written back into RAM 76 at the appropriate location. The fact that this eighth bit is 0 indicates to the decoder 50 that this was the last channel address, such that the following bytes transmitted will contain only channel data.

As the next processing cycle occurs, the section of RAM 76 which was previously used as an input buffer is utilized as an output buffer. The channel addresses are the first eight bit bytes to be outputted, and each channel address, if there are any present, are read from the RAM 76 and loaded into the output shift register 86, and shifted out along the telecommunication system toward the decoder 50. The channel data are the last eight bit bytes to be outputted. Each channel of data, if there are any present, are read from the RAM 76, and loaded into the output shift register 86 and shifted out to decoder 50. A multiplexer 100 is used to permit the encoder 30 to insert the previously described modified (FIG. 6) frame bit pattern and flag bits into the encoded superframe outputted by the encoder.

As illustrated, encoder 30 utilizes a total of four counters in the encoder circuit. There are two counters, the input channel address counter 88 and the input channel data counter 90 which each control which part of RAM 76 the particular RAM buffer section is being written into. The channel address insert counter 92 keeps track of which channel address is written into the channel address area of the buffer to be stored, as described above, in designated channels of the clear channel superframe. The output channel counter 94 is used to keep track of which eight bit byte to transmit to the decoder 50 along the telecommunication system, namely a channel address or channel data.

Figure 10:
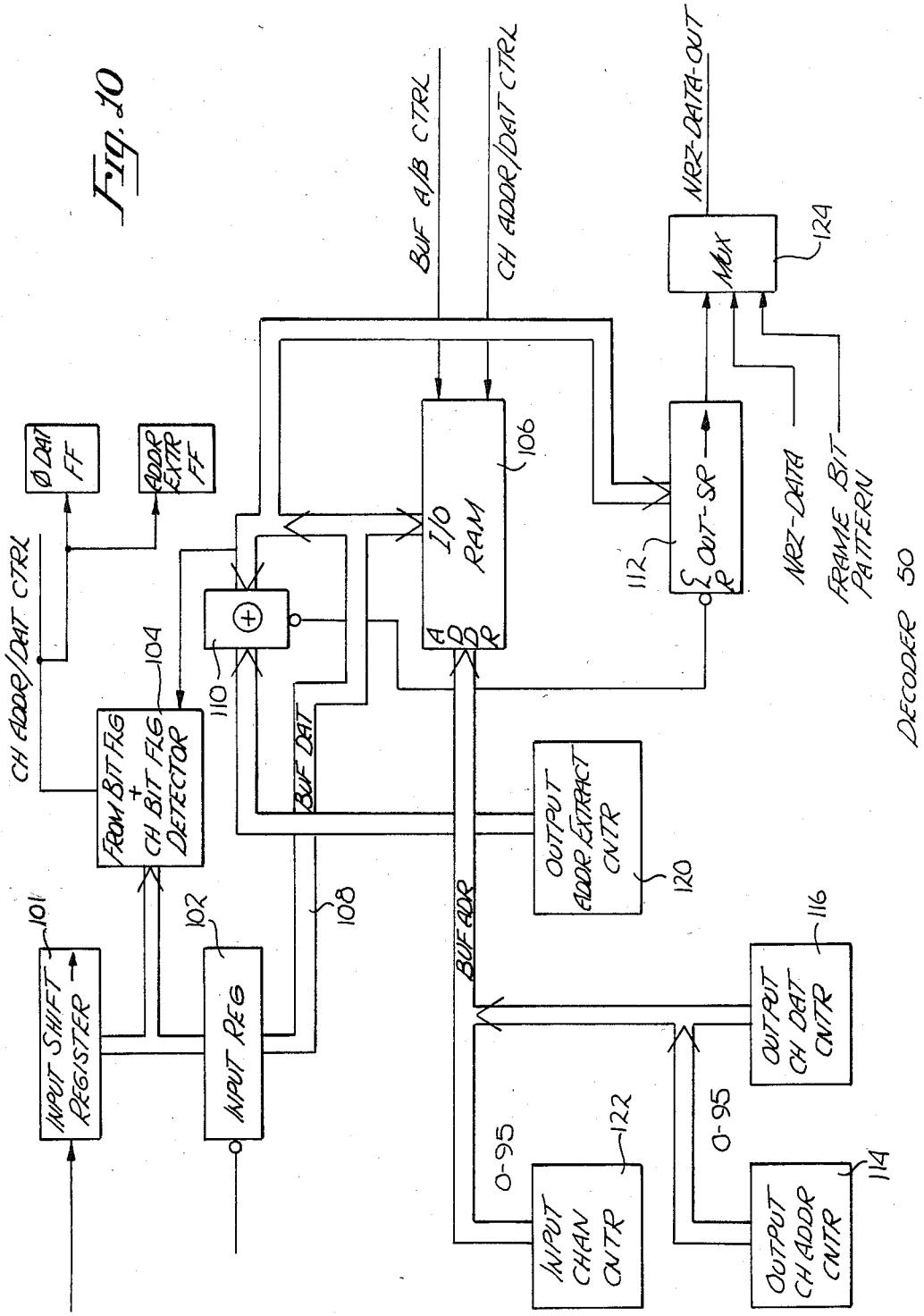
FIG. 10 is a block diagram disclosing a decoder utilized to perform the decoding method of the present invention.
Figure 11:
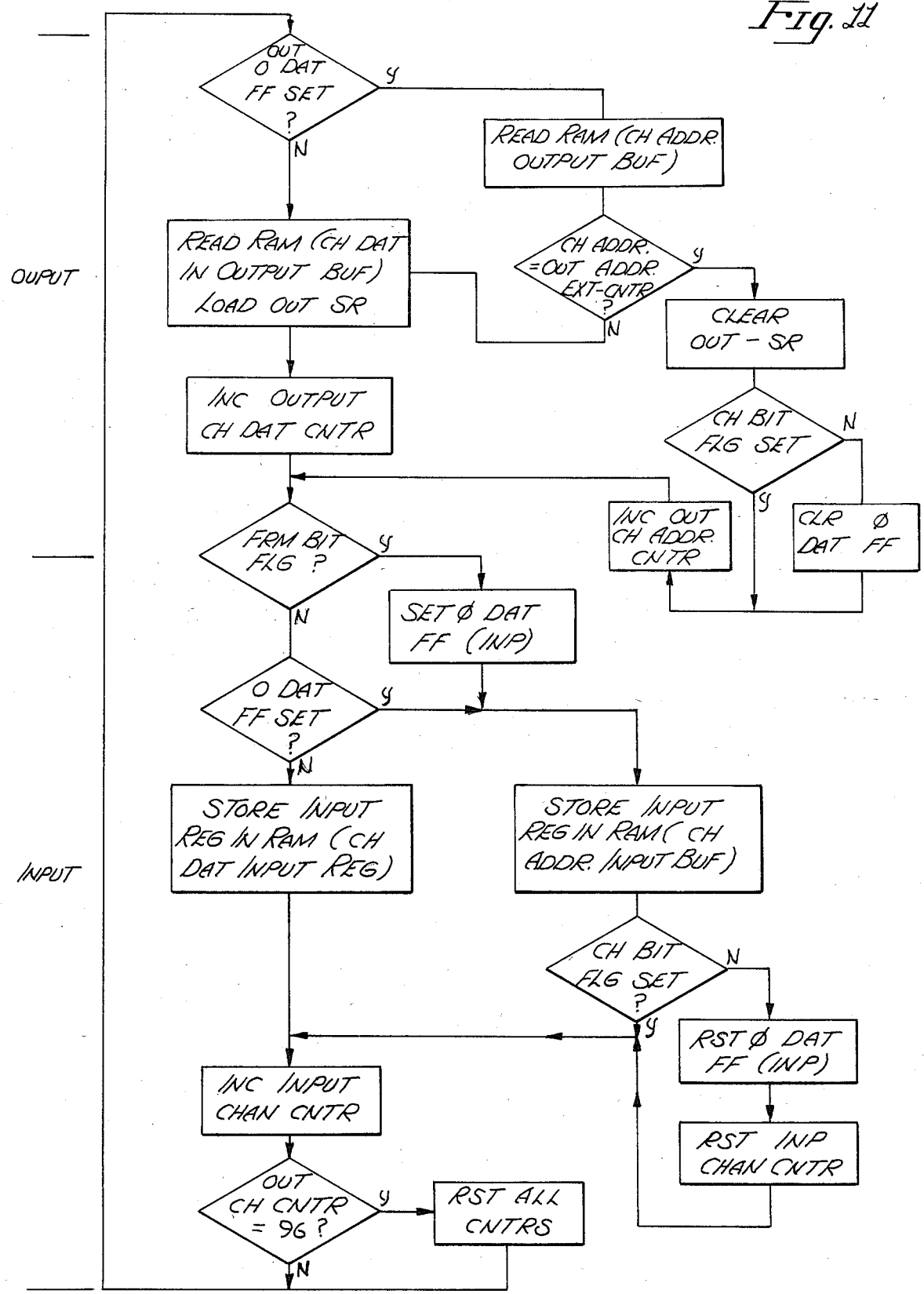
FIG. 11 is a flow chart illustrating the sequence of operations utilized by the decoder of FIG. 10.

With reference to FIG. 10 and the flowchart of FIG. 11, the presently preferred embodiment of the decoder 50 will be described. It will be appreciated that although the structure and order of operation of decoder 50 is illustrated, the method of the present invention may be realized using a variety of digital hardware designs. Accordingly, as with the case of encoder 30, the decoder illustrated in FIG. 10 and described with reference to FIGS. 10 and 11 is representative of only a single possible implementation for realizing the decoding method of the present invention.

The encoded serial data is received by the decoder 50 of the present invention's interface apparatus 35 and is inputted into an input shift register 101 in a non-return to zero (NRZ) format. Each eight bit received channel is latched into the input register 102 from the input shift register 101. In addition, a frame bit flag latch 104 is updated (set if the frame bit at the begining of the clear channel superframe is the opposite polarity of the standard frame bit identified in FIG. 6). During the time the next channel is shifted in, the current channel in the input register 102 is processed. A random access memory (RAM) 106 is coupled to the input register 102 along a bus 108 on which the encoded received data is transmitted. The RAM memory 106 which is used to store each CCSF is divided, as in the case of encoder 30, into two major sections, an input buffer and an output buffer. The input and output buffers are used in a toggle basis such that the section of memory which was used for inputting a clear channel superframe on the previous processing cycle is used to output zero data and channel data on the next processing cycle. Similarly, the section of memory which was used for outputting zero data and channel data on the previous processing cycle will be used for inputting the new CCSF on the next processing cycle.

If the frame bit flag at the beginning of the CCSF is true (opposite to normal frame bit polarity), the first channel processed is stored into the channel address buffer within RAM 106. If the frame bit flag is false (same as normal frame bit polarity), the first channel processed is stored into the channel data buffer of RAM 106. In the event the first eight bit channel received represented a channel address, then all subsequent channel addresses are stored into the channel address buffer until the channel flag (eighth bit) of a received channel byte is determined to be a 0. Upon this occurence, and if there are any more channels to be processed in the inputted CCSF, the subsequent channels received by definition must contain channel data and are stored into the channel data buffer of RAM 106.

As the next processing cycle occurs, the section of memory which was used as the input buffer is used as an output buffer. A comparator 110 is used to determine if the current channel number to be outputted is the same as the current channel address in the output buffer. In the event they are the same, a byte of 0's is loaded into the output shift register 112 for transmission to the receiving DTE 25. If these two bytes are not the same, the current channel data byte in the output buffer is loaded into the output shift register 112 for transmission. The byte of data in output shift register 112 (either all zeros or verbatim data received from DTE 20) is shifted out. In this manner, the all zero channels are placed back into their original position as they were provided by DTE 20 prior to being shifted into the encoder circuit 30. Accordingly, the data which is transmitted out of the decoder 50 is identical to the data which was shifted into the encoder 30. A multiplexer 124 is used by the decoder 50 to insert the original standard (FIG. 6) frame bit pattern and flag bits into the decoded superframe outputted by the decoder.

As illustrated in FIG. 10, there are a total of four counters in the decoder circuit. There are two counters (the output channel address counter 114 and the output channel data counter 116) which control which part of the buffer within RAM 106 is read. The output address extract counter 120 keeps track of what the current channel number is to be outputted, such that the comparison to channel addresses by comparator 110 can be accomplished. The input channel counter 122 is used to keep track of which byte to store into the input buffer of RAM 106 (i.e. is the current inputted data to be utilized as a channel address, or channel data).

Accordingly, an apparatus and method has been disclosed having particular utility for use in interfacing data processing and telecommunication equipment. Although the present invention is described in relation to the Bell T-1 Carrier standard, it will be appreciated by one skilled in the art that the present invention has utility far exceeding the mere interface with the Bell T-1 telecommunication system. It is contemplated that many changes and modifications may be made, by one of ordinary skill in the art, to the materials and arrangement of elements of the invention without departing from the spirit and scope of the invention.

We claim:

1. A method for encoding data for transmission from a first data processing unit to a second data processing unit, said data being organized into a plurality of sequential channels identified by channel numbers (1 . . . N), each of said data channels comprising a plurality (X) of bits, comprising the steps of:
   (a) detecting channels in said data which contain a predetermined value of bits and storing the channel numbers of said channels in a first storage means;
   (b) deleting data contents of said data channels which contain said predetermined value of bits from said data;
   (c) shifting said remaining data in each of said data channels such that data previously stored in said first data channel is stored in a data channel offset by the number of channels stored in said first storage means;
   (d) inserting the channel numbers previously stored in said first storage means in empty data channels created by said shifting step;

whereby said data is encoded for transmission to said second data processing device.

2. The method as defined by claim 1, wherein data is received and decoded by said second data processing unit using a method comprising the steps of:
   detecting channel numbers previously inserted by said first data processing unit in data channels created by said shifting step, and storing said channel numbers in a channel address buffer;
   deleting said channel numbers in said data channels, and shifting said data in said remaining channels such that received data is sequentially stored beginning in said first data channel;
   shifting data located in data channels identified by said channel numbers stored in said channel address buffer, such that an empty channel is created for those channels identified by said stored channel numbers;
   inserting said predetermined bit values in said now empty channels identified by said channel numbers stored in said channel address buffer;

whereby said data is decoded and corresponds to the original data provided to said first data processing unit.

3. The method as defined by claim 1, wherein said data is organized into a plurality of sequential frames comprising a plurality of data channels, each of said frames being delineated by a frame bit.

4. The method as defined by claim 3, wherein the logical states of said frame bits comprise a predetermined bit state sequence.

5. The encoding method as defined by claim 4, further including the step of altering said predetermined bit sequence of said frame bits.

6. The encoding method as defined by claim 5, wherein said predetermined frame bit sequence comprises the following logical states for each sequential frame bit:

1 0 0 0 1 1 0 1 1 1 0 0

7. The encoding method as defined by claim 6, wherein said altering step comprises altering the states of frame bits 4, 8 and 12.

8. The encoding method as defined by claim 5, wherein step (D) of said method further includes inserting a channel flag along with said channel number in said empty data channels, the logical state of said channel flag denoting whether subsequent data channels contain channel numbers.

9. The encoding method as defined by claim 8, wherein said predetermined bit values comprise logical zeros.

10. An interface apparatus including an encoder for encoding data for transmission from a first data processing unit to a second data processing unit, said data being organized into a plurality of sequential channels identified by channel numbers (1 . . . N), each of said data channels comprising a plurality (X) of bits, said encoder comprising:
   input means for inputting and storing said data channels.
   first detection means coupled to said input means for detecting channels in said data which contain a predetermined value of bits and storing the channel numbers of said channels in a first storage means;
   deleting means for deleting data contents of said channels which contain said predetermined value of bits from said data;
   first shifting means coupled to said deleting means for shifting said remaining data in each of said data channels, such that data previously stored in said first data channel is inserted in a data channel offset by the number of channels stored in said first storage means;
   said shifting means further inserting the channel numbers previously stored in said first storage means in the empty data channels created;

whereby said data is encoded for transmission to said second data processing device.

11. The encoder as defined by claim 10, wherein said first storage means includes a random access memory (RAM) for storing said data and said channel address numbers.

12. The encoder as defined by claim 11, wherein said data to be encoded is inputted into a shift register, and said detection means includes a data flip-flop to detect channels having said predetermined value of bits.

13. The encoder as defined by claim 12, wherein said RAM is divided into input and output buffer sections for storing said data and channel addresses.

14. The encoder as defined by claim 13, further including an input channel data counter and an input channel address counter coupled to said RAM to control which buffer section said data and channel addresses are stored in said RAM.

15. The encoder as defined by claim 14, further including an output shift register coupled to said RAM and to a multiplexer for shifting said encoded data in a serial format to said second data processing system.

16. The encoder as defined by claim 15, wherein said multiplexer inserts altered frame bits between sequential frames of said encoded data, said frames comprising a plurality of data channels.

17. The interface apparatus as defined by claim 10, further including a decoder coupled to said second data processing unit, comprising:

receiving means for receiving and storing said encoded data from said first processing unit;

second detection means coupled to said receiving means for detecting channel numbers previously inserted by said first data processing unit in data channels created by said shifting means of said encoder, and storing said channel numbers in a channel address buffer, and deleting data contents of said channel numbers in said data channels and shifting said data in said remaining channels such that received data is sequentially stored beginning in said first data channel;

second shifting means coupled to said detection means for shifting data located in data channels identified by said channel numbers stored in said channel address buffer, such that an empty channel is created for those channels identified by said stored channel numbers;

insertion means coupled to said shifting means for inserting said predetermined bit values in said now empty channels identified by said channel numbers stored in said channel address buffer;

whereby said data is decoded and corresponds to the original data provided to said first data processing unit.

18. The interface apparatus as defined by claim 17, wherein said encoder includes a random access memory (RAM) for storing said data and said channel address numbers.

19. The interface apparatus as defined by claim 18, wherein said RAM is divided into input and output buffer sections for storing said data and channel addresses.

20. The interface apparatus as defined by claim 19, wherein said decoder includes an output shift register coupled to said RAM and to a multiplexer for shifting said decoded data in a serial format to said second data processing system.

21. The interface apparatus as defined by claim 20, wherein said multiplexer inserts frame bits between sequential frames of said decoded data, said frames comprising a plurality of data channels.

22. The interface apparatus as defined by claim 21, wherein said decoder includes a channel address counter and an output channel data counter coupled to said RAM to control which section of said RAM is read.

23. The interface apparatus as defined by claim 22, wherein said decoder includes a comparator to determine if the current channel number to be outputted to said second data processing unit is the same as the current channel address in said output buffer.

* * * * *